Oct. 11, 1949.   C. D. HAYWARD   2,484,564
REVERSE CURRENT ELECTROMAGNETIC TRIP DEVICE
Original Filed Nov. 2, 1944
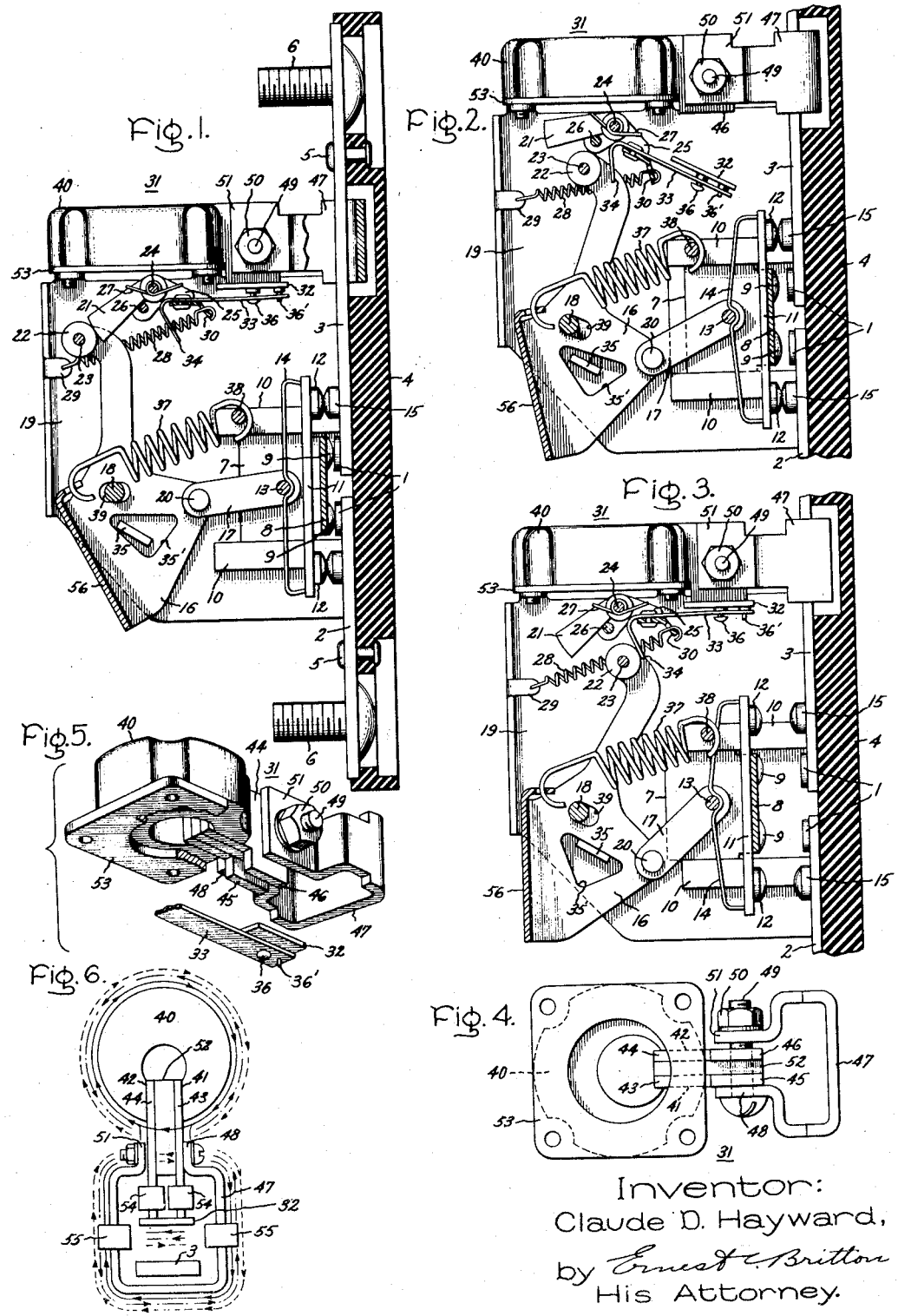
Inventor:
Claude D. Hayward,
by Ernest C. Britton
His Attorney.

Patented Oct. 11, 1949

2,484,564

UNITED STATES PATENT OFFICE 2,484,564

REVERSE CURRENT ELECTROMAGNETIC TRIP DEVICE

Claude D. Hayward, Lansdowne, Pa., assignor to General Electric Company, a corporation of New York Original application November 2, 1944, Serial No. 561,539. Divided and this application December 13, 1945, Serial No. 634,791

1 Claim. (Cl. 175—339)

My invention relates to improvements in tripping devices for electric switches and more particularly to improvements in trip calibrating devices for circuit breakers and especially lightweight, quick opening, direct current circuit breakers, the tripping of which is effected by a flux shifting action based on the direction of flow of current through the circuit breaker.

Reverse current tripping devices for circuit breakers have usually embodied a polarizing coil which is energized from the line voltage. In many applications, this is not desirable because the device is liable to trip on loss of voltage. For aircraft applications, the use of a potential coil is also undesirable because of the additional wiring required and the increase in weight. Reverse current tripping devices embodying polarization by permanent magnets as heretofore constructed were liable to demagnetization by heavy reverse currents. Such currents might even hold the armature in the attracted position, particularly in direct current systems embodying several high current generating sources connected to a bus as in some airplane installations. In such systems, a fault in one generator results in such a heavy reverse current flow to that generator as to render the usual reverse current tripping device inoperative. Inasmuch as weight is a major controlling factor in aircraft installations, simplicity of structure involving the minimum number of parts for satisfactory operation is essential. Also, ruggedness of structure and sensitivity of response to small reverse currents without reversed magnetization of the permanent magnet and failure to operate in consequence of large reverse currents are necessary.

An object of my invention is to provide, for a circuit breaker, a unitary reverse current tripping structure which is polarized by a permanent magnet and which is responsive to relatively small reverse currents without being rendered inoperative by relatively high reverse currents. Another object of my invention is to provide a reverse current flux-shifting trip-calibrating device whereby the release of the armature is effected at different current values by varying an air gap in the magnetic circuit substantially independently of the friction load and inertia of the circuit breaker latching mechanism and associated parts. These and other objects of my invention will hereinafter appear in more detail.

In accordance with my invention, I provide a reverse current tripping device embodying a permanent magnet and a plurality of low retentivity magnetic elements so arranged as to prevent demagnetization of the permanent magnet by heavy reverse currents without loss of sensitivity on relatively small reverse currents. Also in accordance with my invention, the unitary magnetic structure embraces a yoke member, one leg of which is finely adjustable to vary the value of current at which the attracting flux is shifted from the armature. Further in accordance with my invention, I so arrange the armature of the tripping magnet structure that it is biased to move from the attracted position independently of the friction load and inertia of the latch and its associated parts.

This application is a division of my copending application Serial No. 561,539, filed November 2, 1944, now Patent No. 2,472,588, issued June 7, 1949, and assigned to the assignee of this invention.

My invention will be better understood from the following description when considered in connection with the accompanying drawing, and its scope will be pointed out in the appended claim.

In the accompanying drawing, Fig. 1 is a side elevation of a circuit breaker provided with a reverse current flux-shifting trip-calibrating device embodying my invention, the circuit breaker being shown in the circuit closed position; Fig. 2 is an elevation similar to Fig. 1 showing the circuit breaker tripped and the main contacts separated; Fig. 3 is an elevation similar to Fig. 1 showing the circuit breaker in the full open position; Fig. 4 is a plan view of the magnetic structure of the reverse current tripping device as seen from the lower side; Fig. 5 is a perspective view of the reverse current tripping device; and Fig. 6 is an explanatory diagram illustrating the reverse current tripping device.

For the purpose of illustrating my invention, I have shown an electric switch in the form of a circuit breaker comprising stationary contacts, such as silver blocks or pads 1, which are suitably secured to spaced conductor bars 2 and 3, respectively. These bars are secured to a suitable mounting such as a base 4 of insulating material by rivets 5 and are provided with terminals 6. For bridging the gap between the stationary contacts 1, there is a cooperating bridging contact which, as shown, takes the form of a U-shaped member 7 of suitable conducting material on the base 8 of which two suitable contacts, such as rounded silver blocks or pads 9, are suitably secured. Each leg of the U-shaped member or bridging contact 7 is mounted for rectilinear movement between guides 10 of insulating material suitably secured to or forming a part of the base 4. For arc interrupting purposes, there is provided another bridging member 11, which is provided with suitable arcing contacts 12 and which is supported between a projection such as a pin 13 on the bridging contact 7 and the base 8 thereof by a bowed spring 14 so as to effect the closing of the arcing contacts 12 and cooperating arcing contacts 15 on the conductor bars 2 and 3 before the closing of the main contacts 1 and 9 and opening of the main contacts prior to the opening of the arcing contacts.

For closing the circuit breaker, there is provided a rotatably mounted operating member 16 and a link 17 which interconnects the bridging contact 7 and the operating member and forms therewith a toggle for effecting a circuit closing movement of the bridging contact when the operating member is turned in one direction, counterclockwise as shown in the drawing. The operating member 16 is rotatably supported on a pin 18 secured in the circuit breaker frame 19, and the link 17 is pivotally connected to the operating member at 20 and to the bridging contact 7 at the pin 13.

For maintaining the bridging contact 7 in the closed circuit position with the toggle formed by the operating member 16 and the link 17 in a predetermined underset position, means are provided such as a latch or prop 21, which is engageable with the upper end of the operating member 16 upon a predetermined counterclockwise rotation thereof, for holding the operating member against rotation in the opposite direction, clockwise as shown in the drawing. In order to reduce the latch friction load to a minimum, the operating member 16 is provided with a roller 22, which is pivoted on the operating member at 23 and against which the latch abuts in the holding position. In order that the roller 22 may pass under the latch 21 during the circuit closing operation, the latch is pivoted at 24 on a support 25 which is mounted on a pivot 26 in the circuit breaker frame. Also, there is provided resilient means such as a spring 27 which tends to turn the latch 21 counterclockwise into the latching position against the pin 26 as soon as the roller 22 passes by the end of the latch in the circuit closing operation.

For biasing the latch 21 to the releasing position, there is provided suitable means such as a spring 28 which is connected between an ear 29 on the circuit breaker frame 19 and an arm 30 of the latch support 25. For maintaining the latch in the holding position against the bias of the spring 28, I provide, in accordance with my invention, a permanent magnet polarized flux shifting electroresponsive means 31 comprising an armature 32 loosely mounted on a resilient arm 33 extending from the latch support 25. The electroresponsive means 31 will be described in detail hereinafter. For resetting the armature 32 during the circuit opening operation of the circuit breaker, the support 25 is provided with a preferably resilient arm 34 which may be integral with the arm 33 and which is positioned in the path of movement of the roller 22 as the operating member 16 is turned clockwise during the circuit opening operation. This action will be more clearly apparent from an observation of Figs. 2 and 3. In order to limit the circuit opening movement or clockwise rotation of the operating member 16 and the parts secured thereto, suitable means is provided such as a stop 35 which, as shown, is secured to the circuit breaker frame 19 and extends through an opening 35' in the operating member 16.

In order to have the release of the armature 32 under predetermined electrical conditions of the circuit through the circuit breaker independent of the friction load and inertia of the latch 21 and its support 25, the armature is loosely supported on the resilient arm 33 by suitable means such as a rivet 36. This loose mounting also facilitates movement of the armature to an even bearing on its attracting poles. The rivet 36 is positioned substantially at the center of gravity of the armature 32 and is of such a length relatively to the support 25 that the arm 33 in the closed circuit position of the switch is so stressed as to tend to snap the armature from its attracted position upon release of the armature by the magnetic device 31 before any movement of the support 25 and the latch 21 occurs. For maintaining the alignment of the armature relatively to the arm 33, the armature is provided with suitable means such as a guide pin 36' projecting through an opening in the arm 33 large enough to allow movement of the arm relatively to the pin.

For effecting the circuit opening operation of the circuit breaker upon the release of the latch 21, I provide resilient means such as a spring 37 which is connected to the operating member 16 and to a stationary pin 38 on the circuit breaker and which is arranged to be stressed during the circuit closing movement of the operating member. Moreover, in accordance with my invention, I so arrange the direction and application of the pull of the spring 37 that, as long as the operating member 16 is held in the closed circuit position, most of the force of the spring is exerted in a direction to maintain the desired pressure between the main contacts 1 and 9 and the arcing contacts 12 and 15. To secure the utmost from this force, the operating member 16 is arranged to have a limited translatory movement relatively to its pivot 18. For this purpose, the opening for the pivot 18 is in the form of a slot 39 whose length extends in such a direction near the end of the circuit closing movement that the operating member is free to move substantially in the direction of the movements of the bridging contact, as shown in Fig. 1. Thus, when the switch is closed, the large component of the force of the spring 37 perpendicular to the base 4 is opposed by the reaction at the contacts. Consequently there is very little friction on the pin 18 since the component of the spring force parallel to the base is relatively small. Accordingly only a relatively small reaction between the latch 21 and the roller 22 has to be overcome to trip the switch. Also by reason of the translatory movement of the operating member 16 on its pivot 18 substantially in the direction of movement of the bridging contact 7, the spring 37 also acts to compensate for wear of the contact surfaces by maintaining the same contact pressure.

Upon release of the latch 21, the spring 37 so moves the operating member that the pin 18 bears against the outer end of the slot 39, as shown in Figs. 2 and 3. The spring 37 is thus effective to produce the desired circuit opening movement of the operating member 16 and its associated parts.

In accordance with my invention, the electroresponsive tripping device 31, which is of the flux shifting type, comprises a polarizing permanent magnet 40 formed into substantially horseshoe shape as shown and having two opposed spaced substantially parallel pole faces 41 and 42, two low retentivity iron plates or pole pieces 43 and 44 respectively secured thereto in adjacent parallel opposition and having lateral pole faces 45 and 46 respectively, a low retentivity iron yoke member 47 of substantially horseshoe shape and rigidly attached at one end 48 to the pole piece 43, and threaded means 49 and 50 for adjustably positioning the other end 51 of the yoke member adjacent the other pole piece 44 to vary the gap between them and thereby the value of the tripping current in conductor 3 that is interlinked with yoke 47 to shift the attracting flux from the armature 32. Between the pole pieces 43 and 44 there is mounted a suitable nonmagnetic spacer 52 for maintaining the plates or pole pieces 43 and 44 in parallel opposition with the aligned horseshoe permanent magnet 40 overlapping and straddling one end thereof and the oppositely aligned horseshoe-shaped yoke 47 overlapping and straddling the opposite end thereof and armature 32 in attractive abutting engagement with the edges of the plates so as to conduct flux between the lateral pole faces 45 and 46. For best results, the permanent magnet 40 is preferably of the "Alnico" type such as disclosed, for example, in United States Letters Patent 1,947,274; 1,968,569; and 2,027,994 to 2,028,000, inclusive. Inasmuch as certain machining operations on this metal are difficult and costly, I preferably combine the foregoing parts into a unitary structure by suitably bonding the permanent magnet 40 to a nonmagnetic base plate 53 which can readily be bolted to the circuit breaker frame 19, as shown. Thus, for example, the permanent magnet 40 is soldered or otherwise permanently secured to the plate 53. The pole pieces 43 and 44 are also similarly secured to the plate 53 and to the permanent magnet pole faces 41 and 42 with the spacer 52 between them and similarly secured to the plate 53 and to the pole pieces 43 and 44. Also, the end 48 of the yoke 47 is likewise bonded to the pole piece 43. This arrangement eliminates the necessity for any costly machining operations on the "Alnico" permanent magnet 40. The weight of fastening means, such as bolts and the like, which would become loose under the vibrations and jars of aircraft operation, is also eliminated since the bonding of parts requires the very minimum of extra material. However, my invention is concerned primarily with the improved adjustable flux-shifting calibrating yoke 47 interlinking the current conductor 3 and having the ends of the yoke spaced apart for overlapping and straddling one end of the pair of iron plates or pole pieces 43 and 44 extending in parallel opposition from the pole faces of the horseshoe magnet 40 that overlaps and straddles the other ends of the pole pieces with the armature 32 laterally engageable in attractive relation with the edges of the pole pieces, whereby the value of the current in the conductor required to shift the attracting flux from the armature may be accurately varied by moving one end of the iron yoke 47 relative to one of the pole pieces so as to provide an adjustable air gap therebetween. This improved flux-shifting magnetic structure can readily be bonded into a rigid unit that will maintain its flux-shifting calibration accuracy under very severe service conditions.

Reference will now be had to Fig. 6 to explain more in detail the construction and operation of the tripping device 31. In this schematic figure, the armature 32 is turned 90° from its position in attractive abutting engagement with the pole faces 45 and 46 laterally projecting from the edges of the iron plates 43 and 44 as shown in the other figures and placed at the yoke end of the pole pieces 43 and 44 for simplicity in showing and explanation. The solid lines with the arrows indicate the flow lines of the flux of the permanent magnet 40 assuming no other energization of the magnetic structure. Thus, for example, the permanent magnet flux tends to flow from the permanent magnet 40 through the pole piece 43, the armature 32, the pole piece 44 and return; also, through the pole piece 43 and across the gap spacer 52 into the pole piece 44 and return; and, also, through the pole piece 43 into the yoke member 47 to the pole piece 44 and return. The relative reluctances of these three magnetic circuits under these conditions are such that when the armature 32 is moved to the attracted position during the opening movement of the operating member 16, the armature tends to remain in the attracted position.

In order to release the armature from this position in response to reverse current through the circuit breaker, the conductor bar 3 is arranged within the yoke 47 so as to magnetize the tripping magnetic structure in accordance with the magnitude and direction of the current through the circuit breaker. Assuming now that current flow is in the normal or forward direction, then in Fig. 6 the dash-dot lines with the arrows indicate the flow lines the flux due to the circuit current tends to take. Thus, for example, the forward current flux flows from the yoke end 48 into the pole piece 43 and across the gap spacer 52 to the pole piece 44 and across the yoke adjustment gap into the yoke end 51 and return to the yoke 47; also, from the yoke end 48 into the pole piece 43 through the armature 32 into the pole piece 44 and across the yoke adjustment gap into the yoke end 51 and return to the yoke 47; and, also, from the yoke end 48 through the pole pieces 43, the permanent magnet 40, the pole piece 44 and the yoke adjustment gap into the yoke end 51 and return to the yoke 47. It will be noted that under these conditions the flux due to the circuit current assists the flux from the permanent magnet 40 to hold the armature 32 in the attracted position. In view of the two flux paths in parallel with the permanent magnet, it will be apparent that little, if any, of the direct current flux will flow in the permanent magnet itself. Assuming now that current flow is reversed, then the dotted lines with the arrows indicate the flow lines the flux, due to the reverse circuit current, tends to take. Thus, for example, the reverse current flux flows from the yoke end 51 across the yoke adjustment gap into the pole piece 44 and through the armature 32 and pole piece 43 to the yoke end 48 and return to the yoke 47; also, from the yoke end 51 across the yoke adjustment gap into the pole piece 44 and across the spacer gap 52 into the pole piece 43 and the yoke end 48 and return to the yoke 47; also from the yoke end 51 across the yoke adjustment gap into the pole piece 44 through the permanent magnet 40 to the pole piece 43, the yoke end 48 and return to the yoke 47. Thus, under reverse current conditions, it will be noted that the flux in the armature 32 due to the reverse current opposes the permanent magnet flux in the armature whereby to effect the release of the armature. What flux, if any, due to the reverse current flows through the permanent magnet, it will be noted, flows in the same direction as the permanent magnet flux and thereby tends to magnetize the permanent magnet in the right direction rather than to annul the flux of the permanent magnet. This is particularly important in applications such as those for which my device is intended where the magnitude of the reverse current in comparison with the normal current is so great that if the flux due to the reverse current opposes the permanent magnet flux, it would soon weaken, if not entirely eliminate, the desired action of the permanent magnet.

In order to obtain the desired operation, I have found that certain factors must be provided. Thus, the permanent magnet 40 must be large enough to supply the necessary holding flux through the armature 32 and, in addition, supply flux through the shunt gap of the spacer 52 and the yoke 47 in addition to some leakage flux. The pole pieces 43 and 44 must have a reluctance low enough to prevent change of the strength of the permanent magnet 40 on the maximum forward or reverse currents and must be of sufficient cross section to prevent saturation while carrying the flux to which they are subjected under these conditions. The cross sectional area of the yoke 47 is arranged to saturate with two purposes in mind. First, this yoke must saturate so that most of the magnetomotive force due to the maximum current in either the forward or reverse directions will be absorbed in drop across the reluctance of this part of the circuit rather than across the shunt gap. It is desirable to limit the magnetomotive force applied across the shunt gap spacer 52 to a value which would avoid change in the strength of the permanent magnet 40. The yoke 47 should also saturate on high reverse currents so that the flux, which passes through the armature by reason of the current through the circuit breaker and, which is in the reverse direction relative to the flux due to the permanent magnet, does not raise the net armature flux to such a high value in the reverse direction that the armature will be prevented from tripping out.

Because of the nicety of adjustment of the parts and the fact that the armature and its cooperating pole faces are subject to rusting, I find it desirable to coat these surfaces so that they will not rust. The coating must, of course, be thin so that the reluctance introduced into the magnetic circuit is not excessive. On the other hand, the coating must not be so thin that unavoidable variations in the fit of the armature surfaces due to slight surface irregularities or microscopic dust change the reluctance by an intolerably large percent as the armature is parted from the poles and reseated on successive operation. I have found that chromium plating the surface of the armature 32 and its cooperating pole faces 45 and 46 on the pole pieces 43 and 44 produces the desired results because such plating is extremely hard and does not wear and thereby change the gap reluctance appreciably. Also, such chromium plating does not form salts which would tend to form on the surfaces and change the gap reluctance or cause the closely fitted surfaces to stick. Furthermore, traces of chromium plating solution left in the joint cracks of assemblies placed in the plating tank and difficult to wash out do not cause subsequent corrosion as do traces of other plating solutions. On the contrary, they tend to prevent corrosion rather than to promote it. Also, the thickness and uniformity of the plating can be accurately controlled. I believe that chromium plating in the range of 0.00025" to 0.005" for magnetic armature and pole surfaces is a good range for the thickness. Actually, I have found 0.0005" to provide a very good practical value.

In some electrical systems where circuit breakers have tripping devices embodying my invention, it has been found that these circuit breakers would occasionally trip under conditions of normal operation when no fault was present in the generator circuit. This tripping is caused by a pulse of reverse current flowing from the bus back into a generator, occurring, for example, when the speed of the motive means driving the generator is suddenly reduced. The generator voltage regulator responds to the reduced generator voltage due to the suddenly reduced armature speed and begins raising the field current to compensate. Due to the time lag of the response, there is a short period when the generator voltage is lower than the bus voltage and a reverse current flows. The generator cutout relay starts to operate and would disconnect the generator after a short interval if it were not for the fact that circuit breakers embodying my invention are faster and trip first.

In order to prevent this unnecessary tripping, tripping devices embodying my invention may be modified by adding copper lagging rings 54 around the pole pieces 43 and 44, as shown in Fig. 6. Further time delay may be obtained by adding similar rings 55 around the legs of the yoke 47, as indicated in Fig. 6. The purpose of these rings is to cause the magnetic flux change in the branches of the magnetic circuit they surround to lag behind the change in current flowing in the conductor bar 3. This produces a time delay in the tripping of the circuit breaker such that the short duration pulses of reverse current described above do not cause tripping. However, the lagging rings do not prevent the circuit breaker from tripping on sustained reverse currents due to actual generator faults. Actually the time delay caused by the lagging rings varies inversely with the magnitude of the current in the conductor bar 3 so that ample time delay can be obtained to prevent false tripping on the relatively low magnitude pulses without adding appreciably to the tripping time on high fault currents which require fast clearing in order to prevent excessive damage.

Referring now to Fig. 1 in which the circuit breaker is shown in the circuit closed position, it will be noted that the operating member 16 is held by the latch 21, which bears on the pin 26. Also, the support 25, which is biased by the spring 28 in a direction to effect the release of the latch 21, is held against turning by the armature 32 in the attracted position with the leaf spring 33 stressed in a direction tending to move the armature from the attracted position. As long as current flow through the circuit breaker is in the forward direction, conditions will be as indicated by the solid and dash-dot lines in Fig. 6 so that, regardless of the magnitude of the forward current, the armature 32 will not be released. Also, since the yoke 47 is arranged to saturate, the flux due to a heavy forward current will not seriously affect the permanent magnet 40. If now for any reason the direction of current flow in the circuit breaker is reversed, conditions will be as represented by the solid and the dotted lines in Fig. 6. Under these conditions, the holding effect of the flux in the armature 32 due to the permanent magnet 40 is annulled by the effect of the flux due to the reverse current and the armature 32 is released. Consequently it will be quickly snapped away from its associated poles by the force of the stressed spring 33 whereupon the spring 28 turns the latch 21 into the releasing position, shown in Fig. 2, and the spring 37 starts counterclockwise rotation of the operating member 16 to separate the contacts 9 from the contacts 1, as shown in Fig. 2. The operating member 16 continues to rotate in the clockwise direction until it comes to rest against the stop 35 and the arcing contacts 12 on the bridging member 11 are drawn away from the arcing contacts 15 on the conductor bars 2 and 3 finally to break the circuit. During the clockwise movement of the operating member 16, the roller 22 thereon engages the arm 34 of the leaf spring 33 so as to return the armature 32 to the attracted position, as shown in Fig. 3. To close the circuit breaker, it is only necessary to exert the necessary force on the flange 56 of the operating member 16 to turn it counterclockwise into the position shown in Fig. 1. In the particular embodiment of my invention illustrated, this closing operation can be performed merely by pressing on the flange 56 with the thumb. As the operating member is turned counterclockwise, the roller 22 engages the latch 21 and turns it clockwise against the bias of the spring 27 about its pivot 24 out of the way of the roller until the bridging contacts are engaged. During this clockwise movement of the latch, the spring 27 is stressed, and as the roller passes by the latch, the latch is quickly snapped to the holding position shown in Fig. 1.

While I have shown and described my invention in considerable detail, I do not desire to be limited to the exact arrangement shown, but seek to cover in the appended claim all those modifications that fall within the true spirit and scope of my invention.

What I claim as new and desire to secure by Letters Patent of the United States is:

A reverse current responsive device of the flux-shifting type, having in combination a pair of spaced apart iron pole plates, each having a lateral projection from one end to provide a lateral offset pole face, a non-magnetic spacer plate interposed between said pole plates and secured thereto for maintaining said offset pole faces in parallel spaced apart alignment, a permanent horseshoe magnet having a non-magnetic mounting plate secured to one side thereof and to corresponding edges of said spacer and pole plates for axially aligning the magnet with the poles thereof in straddling flux-conducting engagement with the other ends of said pole plates, a horseshoe-shaped iron yoke aligned to straddle the said one end of said pole plates and having one end secured in overlapping flux-conducting engagement with one of said pole plates and the other end spaced apart from the other plate, a movable armature having pivotal mounting means adapted to be secured to said non-magnetic mounting plate to provide for movement of the armature into aligned engagement with said offset pole faces to be attracted by the flux conducted thereby, a current conductor interlinked with said iron yoke to shift the attracting flux from the armature in response to a predetermined reverse current in the conductor, and clamping means extending between the ends of the yoke for moving the other end of the yoke toward the other pole plate to provide an adjustable air gap for predetermining the value of the reverse current in the conductor required to shift the attracting flux from the armature.

CLAUDE D. HAYWARD.

REFERENCES CITED

The following references are of record in the file of this patent:

UNITED STATES PATENTS

| Number | Name | Date |
|---|---|---|
| 1,117,722 | Sweetland | Nov. 17, 1914 |
| 1,488,774 | Atwood | Apr. 1, 1924 |
| 1,534,753 | Watson | Apr. 21, 1925 |
| 1,884,326 | Sosinski | Oct. 25, 1932 |
| 2,013,229 | Andis | Sept. 3, 1935 |
| 2,145,603 | Lybarger | Jan. 31, 1939 |
| 2,165,123 | Ballantine | July 4, 1939 |
| 2,188,803 | Boehne | Jan. 30, 1940 |
| 2,219,157 | Zenner | Oct. 22, 1940 |
| 2,269,149 | Edgar | Jan. 6, 1942 |
| 2,412,247 | Bohn | Dec. 10, 1946 |

FOREIGN PATENTS

| Number | Country | Date |
|---|---|---|
| 494,412 | Great Britain | Oct. 24, 1938 |